(12) United States Patent
Lundberg

(10) Patent No.: US 10,371,035 B2
(45) Date of Patent: Aug. 6, 2019

(54) METHOD AND SYSTEM AT SUPPLY OF ADDITIVE TO AN EXHAUST GAS STREAM

(71) Applicant: SCANIA CV AB, Södertälje (SE)

(72) Inventor: Christer Lundberg, Kalmar (SE)

(73) Assignee: Scania CV AB, Södertälje (SE)

( * ) Notice: Subject to any disclaimer, the term of this patent is extended or adjusted under 35 U.S.C. 154(b) by 260 days.

(21) Appl. No.: 15/110,300

(22) PCT Filed: Jan. 29, 2015

(86) PCT No.: PCT/SE2015/050089
§ 371 (c)(1),
(2) Date: Jul. 7, 2016

(87) PCT Pub. No.: WO2015/115978
PCT Pub. Date: Aug. 6, 2015

(65) Prior Publication Data
US 2016/0326935 A1  Nov. 10, 2016

(30) Foreign Application Priority Data

Jan. 31, 2014 (SE) ...................................... 1450099

(51) Int. Cl.
*F01N 3/20* (2006.01)
*F01N 9/00* (2006.01)
*F01N 11/00* (2006.01)

(52) U.S. Cl.
CPC ............. *F01N 9/005* (2013.01); *F01N 3/208* (2013.01); *F01N 9/00* (2013.01);
(Continued)

(58) Field of Classification Search
CPC .................................. F01N 9/005; F01N 3/208
See application file for complete search history.

(56) References Cited

U.S. PATENT DOCUMENTS

| 2001/0032457 A1 | 10/2001 | Ludwig et al. |
| 2004/0203162 A1 | 10/2004 | Wickert |

(Continued)

FOREIGN PATENT DOCUMENTS

| WO | WO-2011093771 A1 | 8/2011 |
| WO | WO-2015/115979 A1 | 8/2015 |

OTHER PUBLICATIONS

International Search Report for PCT/SE2015/050089 dated May 19, 2015.

(Continued)

*Primary Examiner* — Hieu T Vo
(74) *Attorney, Agent, or Firm* — Moore & Van Allen PLLC; W. Kevin Ransom

(57) ABSTRACT

The present invention concerns a method in connection with the supplying of a first additive for treating an exhaust gas stream resulting from combustion in a combustion engine, wherein said first additive is supplied to said exhaust gas stream, and wherein said first additive is utilized for the reduction of at least a first substance (such as $NO_x$) present in said exhaust gas stream, wherein the method comprises: estimation of a reduction of said first substance based on a first measurement of a presence of said first substance in said exhaust gas stream downstream of said supply of said first additive, and a second measurement of a presence of said first substance in said exhaust gas stream upstream of said supply of additive, comparison of said estimated reduction to a first reduction, and correction of the estimation of said second measurement of said first substance based on said comparison.

23 Claims, 6 Drawing Sheets

(52) U.S. Cl.
CPC .... *F01N 2560/026* (2013.01); *F01N 2560/14* (2013.01); *F01N 2610/02* (2013.01); *Y02A 50/2325* (2018.01); *Y02T 10/24* (2013.01); *Y02T 10/47* (2013.01)

(56) References Cited

U.S. PATENT DOCUMENTS

| | | |
|---|---|---|
| 2009/0185954 A1 | 7/2009 | Qi et al. |
| 2009/0301066 A1 | 12/2009 | Sindano et al. |
| 2010/0024397 A1* | 2/2010 | Chi ................ F01N 3/106 60/285 |
| 2010/0050614 A1 | 3/2010 | Parmentier et al. |
| 2010/0101214 A1* | 4/2010 | Herman ............ F01N 3/208 60/277 |
| 2010/0223914 A1 | 9/2010 | Doring et al. |
| 2011/0320132 A1 | 12/2011 | Zanetti et al. |
| 2012/0085083 A1* | 4/2012 | Zayan ............ B01D 53/9495 60/274 |
| 2013/0131967 A1* | 5/2013 | Yu .................. F02D 41/1462 701/115 |
| 2014/0308190 A1* | 10/2014 | Maertens ............ F01N 3/208 423/212 |
| 2015/0314239 A1* | 11/2015 | Kawaguchi ....... B01D 53/9409 422/111 |
| 2015/0322836 A1* | 11/2015 | Asaura ............ F01N 3/208 422/111 |
| 2016/0144942 A1* | 5/2016 | Kwon .............. G01S 19/14 701/21 |
| 2016/0160785 A1* | 6/2016 | Basu .............. F01N 3/208 701/104 |

OTHER PUBLICATIONS

Written Opinion of the International Searching Authority for PCT/SE2015/050089 dated May 19, 2015.

* cited by examiner

METHOD AND SYSTEM AT SUPPLY OF ADDITIVE TO AN EXHAUST GAS STREAM

CROSS-REFERENCE TO RELATED APPLICATIONS

This application is a national stage application (filed under 35 § U.S.C. 371) of PCT/SE2015/050089, filed Jan. 29, 2015 of the same title, which, in turn, claims priority to Swedish Application No. 1450099-5, filed Jan. 31, 2014 of the same title; the contents of each of which are hereby incorporated by reference.

FIELD OF THE INVENTION

The present invention concerns an exhaust gas purification system, and in particular a method, system, vehicle and computer program product in connection with the supplying of additive to an exhaust gas stream.

BACKGROUND OF THE INVENTION

Because of, for example, increased government interest in pollutants and air quality in, for example, urban areas, emissions standards and regulations have been formulated in many jurisdictions.

Such emissions standards often include sets of requirements that define acceptable limits for exhaust gas emissions from vehicles equipped with combustion engines. For example, emission levels for nitrogen oxides ($NO_x$), carbohydrates (HC), carbon monoxide (CO) and particles are often regulated for most types of vehicles in such standards.

Undesired emissions can, for example, be reduced by reducing fuel consumption and/or via post-treatment (purification) of the exhaust gases produced by combustion in the combustion engine.

Exhaust gases from a combustion engine can, for example, be post-treated through the use of a so-called catalytic purification process. Different types of catalytic converters exist, and different types may be required for various fuels and/or to purify different types of exhaust gas components, and, in the case of at least nitrogen oxides $NO_x$ (such as NO and nitrogen dioxide, $NO_2$), heavy vehicles often contain a catalytic converter in which an additive is supplied to the exhaust gas stream from the combustion in the combustion engine in order to reduce nitrogen oxides $NO_x$ (into mainly nitrogen gas and water vapor).

One commonly occurring type of catalytic converter to which additives are supplied consists of SCR (Selective Catalyst Reduction) catalytic converters. SCR catalytic converters use ammonia ($NH_3$) or a compound from which ammonia can be generated/formed as an additive to reduce the level of nitrogen oxides $NO_x$. The additive is injected into the exhaust gas stream resulting from the combustion engine, upstream of the catalytic converter.

The additive supplied to the catalytic converter is absorbed (stored) in the catalytic converter, whereupon nitrogen oxides $NO_x$ in the exhaust gases react with the ammonia stored in the catalytic converter. When supplying an additive, it is important that the amount of additive not be too great or too small. It is thus desirable for the supplied amount of additive to correspond to an anticipated amount of additive.

SUMMARY OF THE INVENTION

One object of the present invention is to provide a method in connection with the supplying of additive to an exhaust gas stream.

The present invention concerns a method in connection with the supplying of a first additive for treating an exhaust gas stream resulting from combustion in a combustion engine, wherein said first additive is supplied to said exhaust gas stream, and wherein said first additive is used to reduce at least a first substance present in said exhaust gas stream. The method comprises:

estimation of a reduction of said first substance based on a first measurement of a presence of said first substance in said exhaust gas stream downstream of said supply of said first additive and a second measurement of a presence of said first substance in said exhaust gas stream upstream of said supply of additive, comparison of said estimated reduction to a first reduction, and correction of the estimation of said second measurement of said first substance, based on said comparison.

The presence of at least certain substances in an exhaust gas stream resulting from combustion can be reduced by means of a supply of additive to the exhaust gas stream, whereupon the additive reacts with one or more substances present in the exhaust gas stream so as to thereby form less hazardous substances.

For example, a supply of additive is needed to reduce the concentration of nitrogen oxides $NO_x$ in the exhaust gases from the combustion engine. However, it is important that the additive be supplied in the correct proportions in relation to the substance(s) that are to be reduced. If too small an amount of additive is supplied in relation to the presence, in the exhaust gas stream, of the substance that is to be reduced, an undesired surplus of the substance will prevail, and thus be released into the surroundings of the vehicle, with a risk that permissible limit values will be exceeded.

Conversely, if too large an amount of additive is supplied in relation to the presence of the substance that is to be reduced, there will instead be a risk that other undesirable substances supplied via the additive will be released into the surroundings.

The risk of undesired emissions can be reduced by adapting the supply of additive, i.e. determining whether the supplied amount actually corresponds to the anticipated amount of supplied additive and, if necessary, correcting the supply of additive.

In connection with the adaptation, a correction factor is usually determined that is then applied to the supplied of additive. This often works well, but, as identified in the present application, the correction may nevertheless have undesired effects in certain situations. In many cases a sensor arranged upstream of the supply of additive is used to determine the untreated content of the substance that is to be reduced. Said sensor usually has the same precision as a corresponding sensor arranged downstream of the reduction of additive. Using the sensor readings from both sensors, it is possible in such cases to obtain a very good estimation of the conversion rate, and a correction factor that entails good correction of the supply of additive to the desired conversion rate can thus be obtained as well.

However, such a sensor arranged upstream of the supply of additive is not always used to determine the unreduced content of the substance that is to be reduced. A suitable calculation model can instead be used to estimate the presence of the substance that is to be reduced, such as a model of the combustion in the combustion engine of the vehicle, whereupon the presence of said first substance in the exhaust gas stream can be calculated based on said model. There is greater uncertainty with this type of system with regard to the actual prevailing content of said first substance in the exhaust gas stream before the additive is supplied. This entails in turn that, during the adaptation, the determined correction factor may have exaggerated consequences under certain operating conditions, e.g. if the adaptation is carried out at a low conversion rate and the correction factor obtained in connection therewith is applied at higher conversion rates as well, as a high correction factor at a low conversion rate will entail, proportionally, a very large change in the amount of supplied additive if the determined correction factor is applied at higher conversion rates.

The risk that an adaptation will have undesired consequences in systems where the content of the substance that is to be reduced in the exhaust gas stream emitted by the combustion engine is determined based on a calculating model is reduced according to the present invention. However, the invention is also applicable to systems where the content of the substance that is to be reduced in the exhaust gas stream emitted by the combustion engine is determined through the utilization of a sensor, whereupon the content upstream of the supply of additive as determined by means of the sensor signals is corrected according to the present invention.

In connection with adaptation, this is achieved according to the invention by correcting the presence of said first substance as estimated using said calculation model instead of correcting the supply of additive. The amount of additive supplied will then instead be corrected in dependence upon the altered estimation of said first substance. The inventor of the present invention has realized that the method according to the invention results in a more correct supply of additive when conversion rates other than the conversion rate at which the adaptation is carried out are applied.

Said first substance can consist, for example, of nitrogen oxides $NO_x$.

As is explained below, the available adaptation time during the adaptation may be limited and, according to one embodiment, a specific type of adaptation is used that better utilizes the available adaptation time.

Additional characteristics of the present invention and the advantages thereof will be presented in the following detailed description of exemplary embodiments and the accompanying drawings.

DETAILED DESCRIPTION OF PREFERRED EMBODIMENTS

The present invention will be exemplified for a vehicle below. However, the invention is also applicable to many types of means of transport, such as aircraft and watercraft, as long as an additive is being added to an exhaust gas stream resulting from combustion.

Furthermore, the term "substance" is used in the present description and accompanying claims and comprises, at least in the present description and accompanying claims, chemical compounds.

Figure 1A:
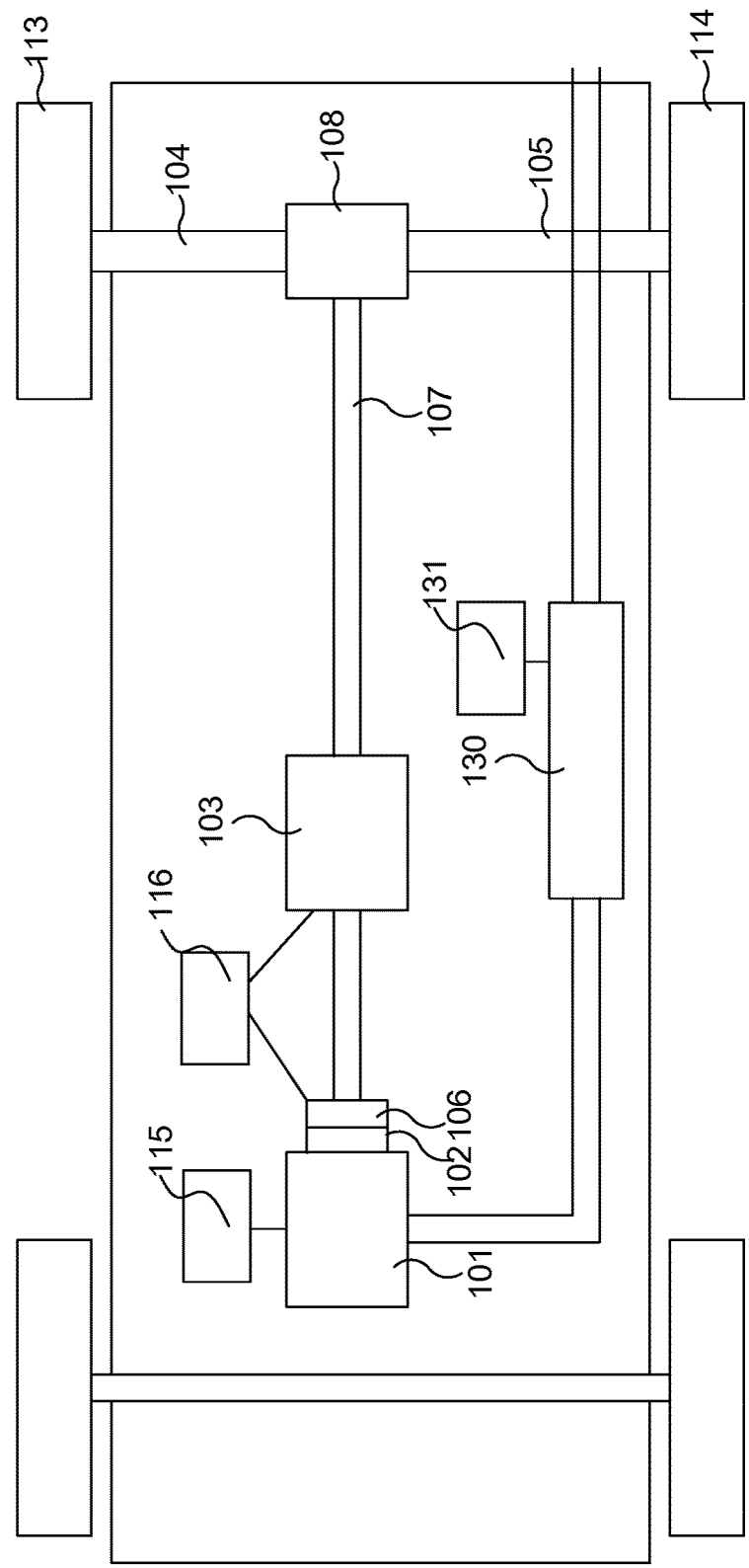
FIG. 1A shows a drivetrain in a vehicle in which the present invention can be used advantageously.

FIG. 1A schematically depicts a drivetrain in a vehicle 100 according to one embodiment of the present invention. The vehicle 100 depicted schematically in FIG. 1A comprises a drivetrain with a combustion engine 101, which is connected in a customary manner via a shaft emerging from the combustion engine, usually via a flywheel 102, to a transmission 103 via a clutch 106. The combustion engine 101 is controlled by the control system of the vehicle 100 via an engine control unit 115. In the present example, the clutch 106 and transmission are similarly controlled by a control unit 116.

Furthermore, a shaft 107 emerging from the transmission 103 drives drive wheels 113, 114 via a final drive 108, such as a typical differential, and drive axles 104, 105 connected with said final drive 108. FIG. 1A thus shows a drivetrain of a specific type, but the invention is applicable to all types of drivetrains, and to, for example, hybrid vehicles. The depicted vehicle also comprises a post-treatment system 130 for post-treatment (purification) of the exhaust gases resulting from combustion in the combustion engine.

The functions of the post-processing system are controlled by a control unit 131.

The post-processing systems can be of various types and, according to the embodiment shown, additive is supplied to a catalytic exhaust gas purification process. An example of a post-processing system in which the present invention can be applied is shown in greater detail in FIG. 2 and, in the exemplary embodiment shown, the post-processing system includes an SCR (Selective Catalytic Reduction) catalytic converter 201. The post-processing system can also comprise additional components (not shown), such as additional catalytic converters and/or particle filters, which can be arranged upstream and/or downstream of the SCR catalytic converter 201.

As noted above, a supply of an additive is needed in connection with reduction of the concentration of nitrogen oxides $NO_x$ in the exhaust gases from the combustion engine by means of the utilization of an SCR catalytic converter. Said additive is often urea-based, and can consist, for example, of AdBlue, which consists in principle of urea diluted with water. Urea forms ammonia when heated. Alternatively, another suitable additive can be used.

Figure 2:
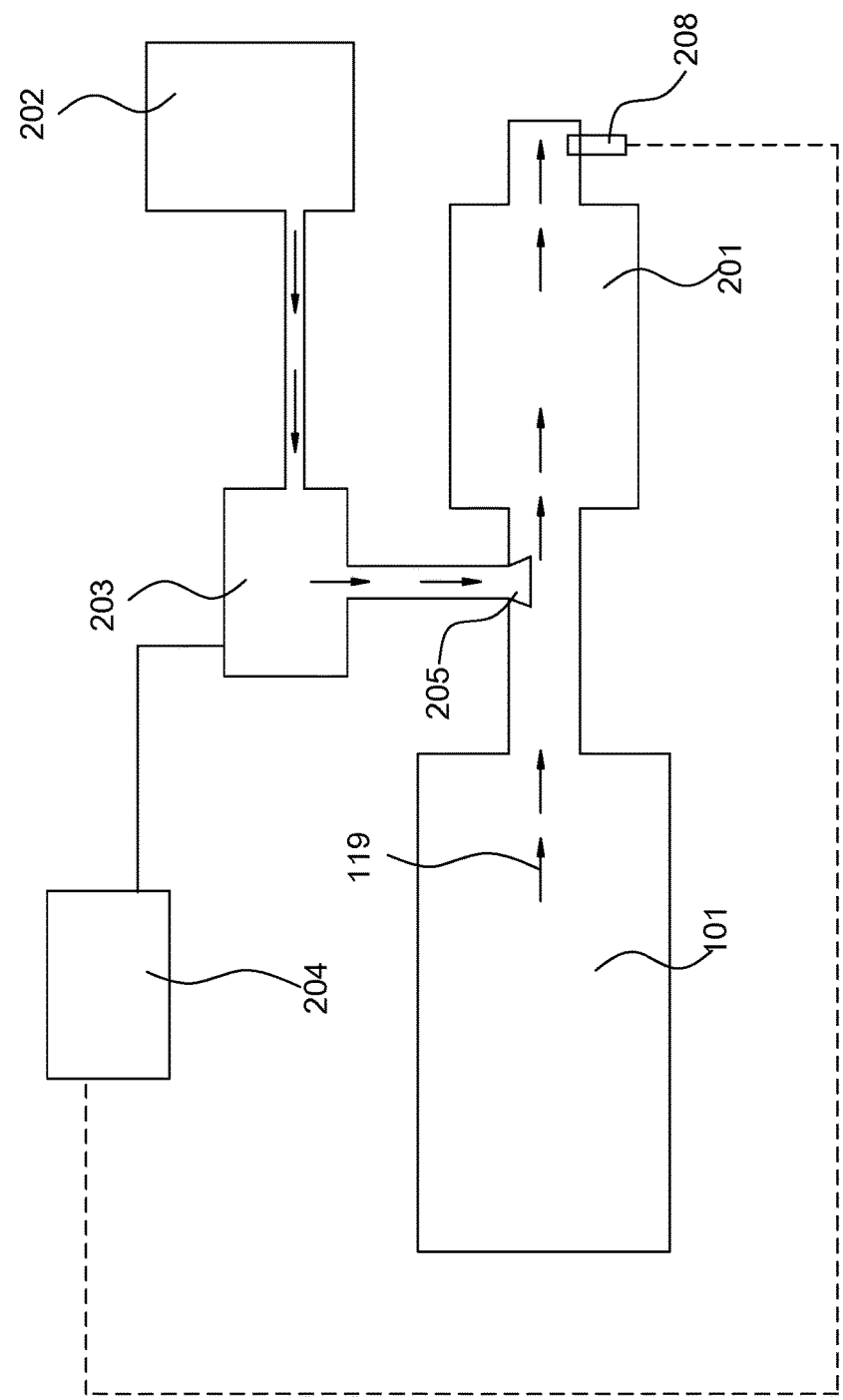
FIG. 2 shows an example of a post-treatment system in a vehicle in which the present invention can be used advantageously.

FIG. 2 shows, in addition to said catalytic converter 201, a urea tank 202 that is connected to a urea dosing system (UDS) 203.

The urea dosing system 203 comprises or is controlled by a UDS control unit 204, which generates control signals for controlling the supply of additive so that the desired amount is injected into the exhaust gas stream 119 resulting from the combustion in the cylinders of the combustion engine 101 from the tank 202 by means of an injection nozzle 205 upstream of the catalytic converter 201.

Urea dosing systems are generally well described in the prior art, and the precise manner in which the injection of additive occurs is consequently not described in detail here, but rather the present invention concerns a method for correcting the supply of additive with a view to ensuring that the supplied amount of additive corresponds to an anticipated amount of additive and, in particular, the present invention concerns a method that improves the precision during the supply of additive when uncertainty prevails regarding the presence of the substance that is to be reduced before additive is supplied. The method according to the invention can be arranged so as to be carried out by any suitable control unit.

Control systems in vehicles generally consist of a communication bus system consisting of one or more communication buses for connecting together a number of electronic control units (ECUs), or controllers, and various components arranged in the vehicle 100. Such a control system can thus comprise a large number of control units, and the responsibility for a specific function can be shared by more than one control unit.

For the sake of simplicity, only three electronic control units 115, 116, 131 will be shown in addition to the control unit 204 shown in FIG. 1A. The method according to the present invention can thus be arranged so as to be performed by any suitable control unit present in the control systems of the vehicle 100, such as the UDS control unit 204 or the control unit 131, which is generally responsible for the function of the post-treatment system 130, or be shared among a plurality of control units present in the vehicle 100.

Control units of the type shown are normally arranged so as to receive sensor signals from various parts of the vehicle, e.g. from the transmission, engine, clutch and/or other control units or components in the vehicle. The control unit-generated control signals are normally dependent on both signals from other control units and signals from components. For example, the control by the control unit 204 of the supply of additive to the exhaust gas stream 119 will, for example, depend on information that is, for example, received from one or more additional control units. For example, the control can be based at least in part on information from the control unit 115 that is responsible for the function of the combustion engine 101.

The control units can further be arranged so as to transmit control signals to various parts and components in the vehicle, such as elements for controlling the injection nozzle 205. The present invention can thus be implemented in any arbitrary one of the foregoing control units, or in any other suitable control unit in the control system of the vehicle.

The control of various functions by the control units is further often controlled by programmed instructions. Said programmed instructions typically consist of a computer program, which, when executed in the control unit, causes the control unit to perform the desired control, such as controlling the various functions present in the vehicle, and to perform method steps according to the present invention.

The computer program commonly constitutes part of a computer program product, wherein the computer program product includes a suitable storage medium 121 (see FIG. 1B) with the computer program stored on said storage medium 121. The computer program can be stored in non-volatile fashion on said storage medium. Said digital storage medium 121 can, for example, consist of any of the group consisting of: ROM (Read-Only Memory), PROM (Programmable Read-Only Memory), EPROM (Erasable PROM), Flash memory, EEPROM (Electrically Erasable PROM), a hard drive unit, etc, and be arranged in or in connection with the control unit, whereupon the computer program is executed by the control unit. The behavior of the vehicle in a specific situation can thus be adapted by changing the computer program instructions.

Figure 1B:
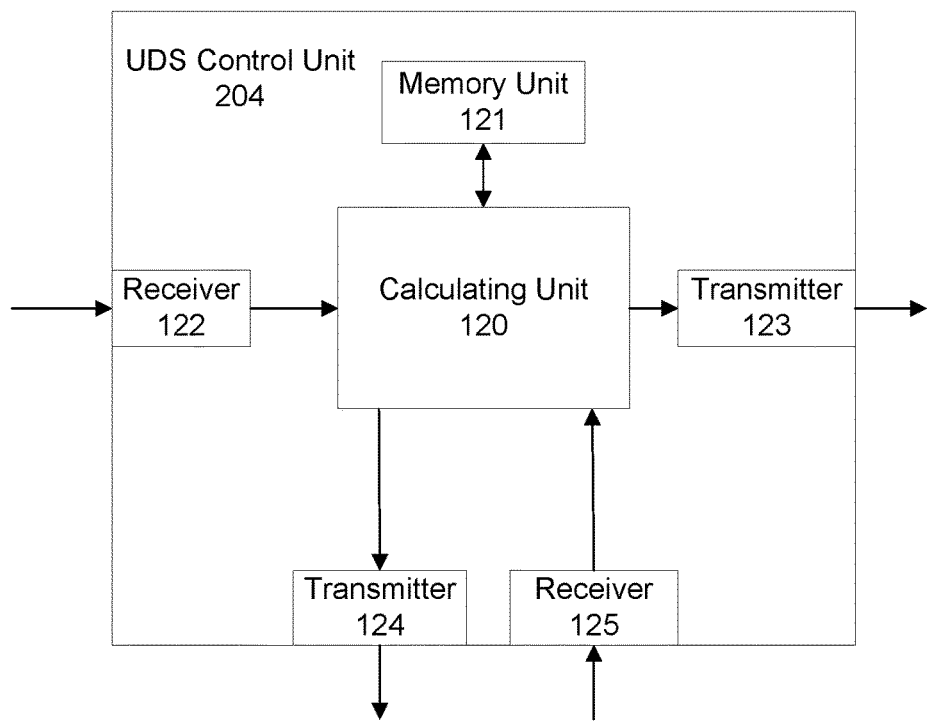
FIG. 1B shows a control unit in a vehicle control system.

An exemplary control unit (the UDS control unit 204) is depicted schematically in FIG. 1B, wherein the control unit can in turn comprise a calculating unit 120, which can consist of, for example, any suitable type of processor or microcomputer, e.g. a circuit for digital signal processing (Digital Signal Processor, DSP), or a circuit with a predetermined specific function (Application Specific Integrated Circuit, ASIC). The calculating unit 120 is connected to a memory unit 121, which provides the calculating unit 120 with, for example, the stored program code and/or the stored data that the calculating unit 120 requires to be able to perform calculations, e.g. to determine whether an error code is to be activated. The calculating unit 120 is also arranged so as to store partial or complete results of calculations in the memory unit 121.

The control unit is further equipped with devices 122, 123, 124, 125 for respectively receiving and transmitting input and output signals. Said input and output signals can contain waveforms, pulses or other attributes that can be detected by the devices 122, 125 for receiving input signals as information for processing by the calculating unit 120. The devices 123, 124 for transmitting output signals are arranged so as to convert calculation results from the calculating unit 120 into output signals for transfer to other parts of the control system of the vehicle and/or the component(s) for which said signals are intended. Each and every one of the connections to the devices for respectively receiving and transmitting input and output signals can consist of one or more of a cable, a data bus, such as a CAN bus (Controller Area Network bus), a MOST bus (Media Oriented Systems Transport), or some other bus configuration; or a wireless connection.

As noted above, the SCR catalytic converter 201 is dependent for its function upon access to a suitable substance by means of which a desired reduction can be carried out, such as ammonia $NH_3$, which, according to the foregoing, can be supplied by supplying a suitable additive. In connection with the reduction of nitrogen oxides $NO_x$ in the SCR catalytic converter it is important that nitrogen oxide $NO_x$ and ammonia $NH_3$ be supplied in the correct proportions to one another. If too small an amount of ammonia $NH_3$ is supplied to the SCR catalytic converter in relation to the presence of nitrogen oxides $NO_x$ in the exhaust gas stream, a surplus of nitrogen oxides $NO_x$ will prevail after the SCR catalytic converter 201. Nitrogen oxide emissions are, as noted, regulated under laws that include the limit values that may not be exceeded. Too small an amount of ammonia $NH_3$ thus entails a risk that nitrogen oxides $NO_x$ will not be reduced to the desired extent, whereupon the limit values with respect to nitrogen oxides $NO_x$ may be exceeded.

Conversely, if too large an amount of ammonia $NH_3$ is supplied in relation to the amount of nitrogen oxides $NO_x$ in the exhaust gas stream, a surplus of ammonia will prevail after the SCR catalytic converter, and will thus be released into the surroundings of the vehicle 100. Ammonia $NH_3$ consists of a strong smelling and also harmful substance that is also often regulated under laws regarding emissions, with the result that an ammonia surplus is not desirable either.

It is thus desirable for the supply of ammonia $NH_3$ to be controlled in such a way that as little nitrogen oxide $NO_x$ and/or ammonia $NH_3$ as possible is present when the exhaust gas stream is released into the surroundings of the vehicle 100. For this reason, adaptations of the supply of additive are carried out in order to ensure that an anticipated amount of additive is actually supplied to the exhaust gas stream.

In connection with such adaptation, as well as for the general determination of the presence of nitrogen oxides in the exhaust gas stream downstream of the SCR catalytic converter, an $NO_x$ sensor 208 (see FIG. 2) arranged downstream of the SCR catalytic converter 201 can be used. The $NO_x$ sensor 208 is, however, commonly cross-sensitive to ammonia $NH_3$, which means that emitted sensor signals represent the combined presence of nitrogen oxides $NO_x$ and ammonia $NH_3$. This means that, in those cases in which the $NO_x$ sensor 208 indicates an elevated level, it is not possible to determine, based solely on the emitted signals, whether the reason why the level is elevated is that the dosage of ammonia is too high, whereupon the share of ammonia downstream of the SCR catalytic converter is consequently too high, or whether the dosage of ammonia is too low and the proportion of residual nitrogen oxides $NO_x$ downstream of the SCR catalytic converter 201 is thus far too high.

In order to avoid such uncertainty, a method is commonly applied in connection with such adaptation wherein the $NO_x$ conversion is reduced, i.e. the supply of additive is decreased to a level at which it can be ensured that complete $NO_x$ conversion will not prevail, and that a surplus of nitrogen oxides $NO_x$ in the exhaust gas stream is consequently certain to prevail.

Figure 3:
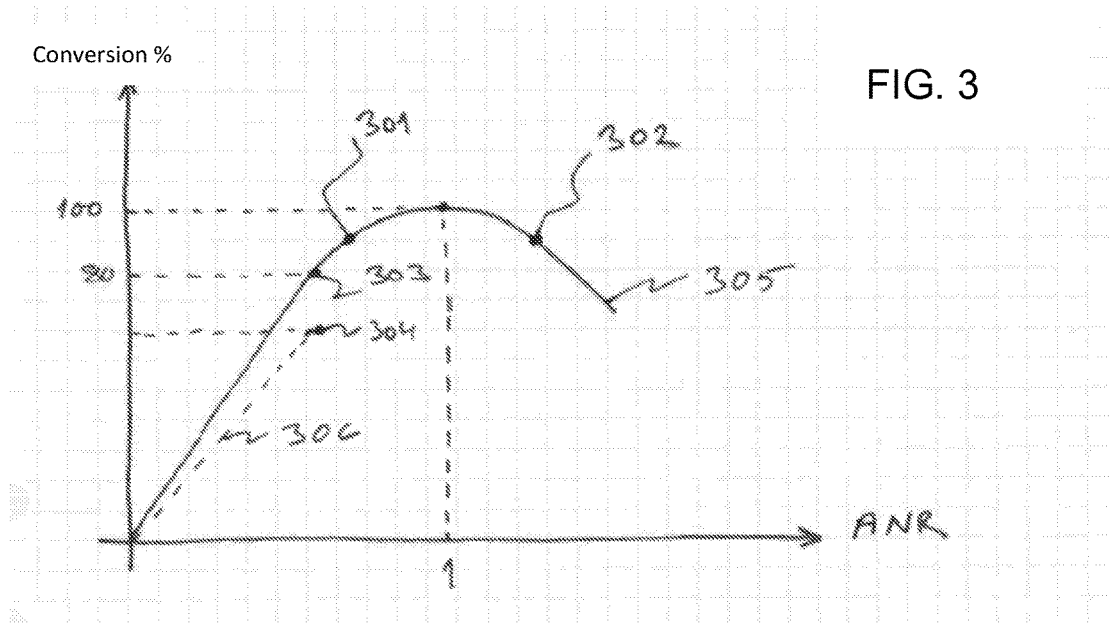
FIG. 3 shows an example of the change in the conversion rate with the supplied additive in connection with the conversion of a substance.

This is illustrated in FIG. 3, where a curve 305 representing the $NO_x$ conversion as a function of supplied additive is shown. The x-axis represents the ammonia-nitrogen oxide ratio (ANR), which consists of $$\frac{NH_3}{rawNO_x}$$

i.e. the amount (content) of ammonia $NH_3$ divided by "$rawNO_x$". "$rawNO_x$" consists of the untreated amount (content) of nitrogen oxide $NO_x$ upstream of the SCR catalytic converter 201. The amount/content of $rawNO_x$ can be determined, for example, by means of an $NO_x$ sensor 207 arranged upstream of the SCR catalytic converter 201. However, such sensors are not always available and, according to the present example, a calculation model is instead used to determine the presence of $NO_x$ in the exhaust gas stream resulting from the combustion. This thus entails that the presence of nitrogen oxides $NO_x$ is, for example, estimated based on a model of the combustion in the combustion engine 101. A corresponding amount of additive is then supplied based on the presence of nitrogen oxides in the exhaust gas stream, $rawNO_x$, as estimated by means of the calculation model.

One mole of ammonia $NH_3$ is generally needed for the reduction of one mole of nitrogen oxides $NO_x$, with the result that complete (100%) conversion, i.e. complete reduction of nitrogen oxides $NO_x$, is ideally achieved at an ANR ratio=1, as is also shown in the figure. During the reduction, ammonia and nitrogen oxides react with one another to form mainly nitrogen gas and water vapor. The same amounts of ammonia and nitrogen oxides $NO_x$ are thus ideally supplied to the exhaust gas stream. A deficit of ammonia thus prevails to the left if ANR=1 in FIG. 3, while a surplus of ammonia prevails to the right if ANR=1.

In FIG. 3 the y-axis represents the conversion rate as a percentage, which can be expressed, for example, in percent, as:

$$\left(1 - \frac{tpNO_x}{rawNO_x}\right) \cdot 100 \qquad \text{(Equation 1)}$$

where $tpNO_x$ represents "tailpipe" $NO_x$, i.e. the presence of nitrogen oxides when the exhaust gas stream is released into the surroundings of the vehicle, as determined by means of the $NO_x$ sensor 208.

As can be seen in FIG. 3, one and the same estimated conversion rate can, through the use of the $NO_x$ sensors 207, 208, be obtained for two different actual ratios, depending on the cross-sensitivity of the $NO_x$ sensors to ammonia $NH_3$. This is exemplified for a conversion rate of ca. 90% by points 301 and 302 in FIG. 3. The closer the conversion is to maximum (100%) conversion, the closer these points will be to one another, and if the conversion rate is high, it may be difficult to known with certainty whether the dosage is actually at point 301, whereupon an increase in the amount of supplied additive should be carried out, or if the conversion is, in practice, at point 302, with the result that the amount of supplied additive should instead be reduced.

For this reason, the conversion rate during adaptation can be reduced to a conversion rate at which it is certain, or extremely likely, that a deficit of ammonia $NH_3$ will prevail. This is illustrated by point 303, which in this example represents a conversion rate of ca. 80%, although conversion rates significantly lower than 80% can be used in connection with adaptation. It can also be the case that conversion significantly lower than 100% is generally used during vehicle travel, e.g. in the event that only a certain reduction is needed for the prevailing regulations to be fulfilled. If, in such a situation, it is found that the anticipated conversion rate in practice is lower than (or exceeds) the anticipated conversion rate, e.g. in that the estimated conversion rate is at point 304 instead of the anticipated point 303, the supply of additive can be corrected (in this case increased) so that the anticipated conversion is achieved, in that the conversion is caused to follow curve 305 rather than 306.

By proceeding in this manner, it is thus possible to adapt the supply of additive with no, or at least with a reduced, risk that a surplus of ammonia will affect the result.

However, when a calculation model is used to estimate the nitrogen oxide content upstream of the supply of additive, it is not certain that the adaptation that is performed for a given conversion rate will be correct for other conversion rates. If, for example, an adaptation is performed for a conversion rate of 10%, and it proves at this conversion rate that a very large percentage change in the supply of additive is needed, which at this conversion rate could still involve very small changes in the calculated amount, the correction factor will have the same effect at higher conversion rates, but then it will have a much greater impact on the amount of additive supplied, as this will continue to be calculated up (or down) by the same correction.

This example points to a major effect on the supply of additive, where it is not at all certain that the determined correction factor will be representative for higher conversion rates. Minor differences in conversion rate will result in less "extreme" consequences in connection with adaptation, but the basic problems and their consequences still remain.

One of the reasons for this is that the uncertainty associated with the presence of nitrogen oxides $NO_x$ in the exhaust gas stream as estimated by means of a calculation model is greater than the uncertainty associated with the use of a sensor. For example, the precision of the sensor can be essentially constant for different combustion engine loads with their associated variations in the amount of $NO_x$ in the exhaust gas stream, while the precision of the calculation model can vary to a greater extent, both with respect to combustion engine load and with respect to variations in environmental parameters, such as ambient humidity etc.

Figure 4:
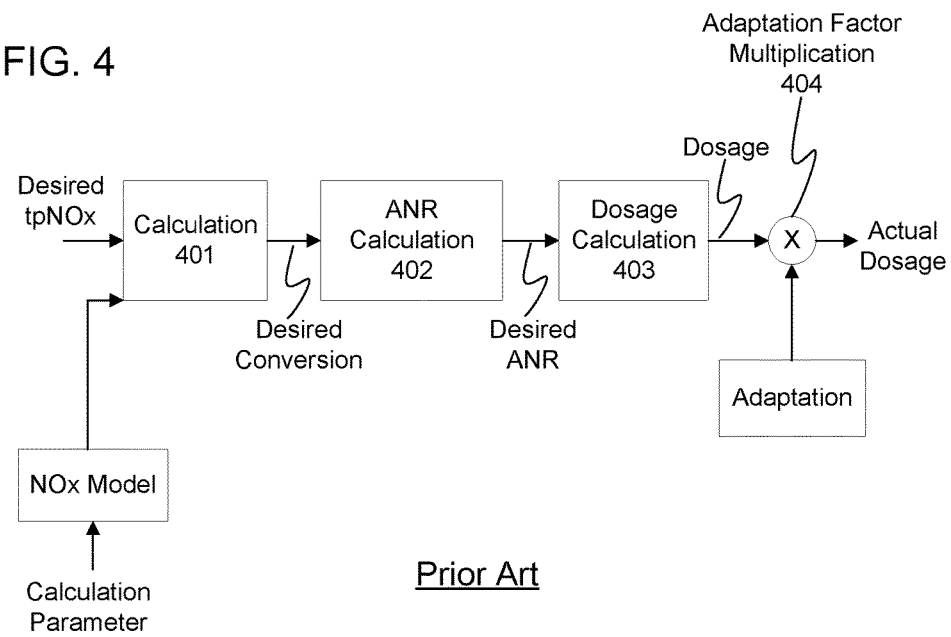
FIG. 4 shows an example of how the supply of additive can be corrected according to the prior art.
Figure 5:
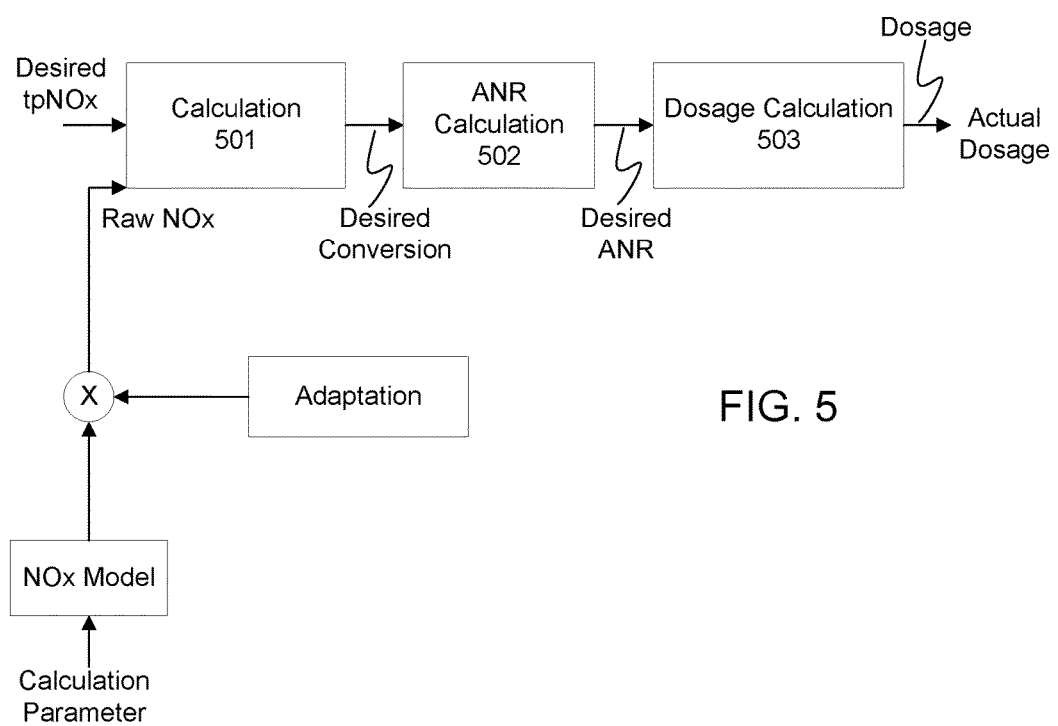
FIG. 5 shows a correction of the supply of additive according to the invention.

Such negative effects of uncertainty in connection with determination of the nitrogen oxide content before the supply of additive are reduced according to the present invention, and the difference between the method according to the invention and other solutions is illustrated in FIGS. 4-5, wherein types of solutions differing from the invention are illustrated in FIG. 4.

FIG. 4 shows a schematic example of the adaptation principle. The amount/content of $rawNO_x$ is calculated as per the example shown using any suitable calculation model, such as an $NO_x$ model, and input to a calculation block 401. As will be known to one skilled in the art, there are generally many types of $NO_x$ models, and any arbitrary suitable model can be used according to the present invention, wherein the calculation of the presence of $rawNO_x$ is performed through the utilization of suitable calculation parameters. A desired "tailpipe" $NO_x$, $tpNO_x$, i.e. the desired presence of nitrogen oxide when the exhaust gas stream is released into the surroundings of the vehicle, is similarly input to the calculation block 401. A desired conversion is determined in block 401 based on these data, which is input to a block 402. A corresponding ammonia-nitrogen oxide ration (ANR) is determined in block 402, which ratio can, for example, be determined by utilizing a suitable representation of a curve of the type shown in FIG. 3, whereupon the desired conversion rate can be translated into a desired ammonia-nitrogen oxide ration (ANR).

Based on the determined ammonia-nitrogen oxide ratio (ANR), a dosage of additive is then determined in block 403, wherein the determined dosage depends on the amount of $rawNO_x$. Once this dosage has been adapted, with a resulting correction factor as a consequence, said correction factor is applied to the dosage determined in block 403, i.e. the determined dosage is multiplied by the adaptation factor, whereupon an actual dosage is obtained. This is indicated by 404 in FIG. 4. As noted above, said correction factor is then applied regardless of conversion factor (as is known, at/around 100% conversion another type of adaptation can be performed, and this can also be arranged so as to be performed continuously. The present invention is, however, applicable to such adaptation as well). With regard to the adaptation, it can be performed in any suitable manner, and an advantageous example that is also described in co-pending Swedish patent application 1450098-7 with the title "FÖRFARANDE AND SYSTEM FÖR ATT ADAPTERA TILLFORSEL AV TILLSATSMEDEL TILL EN AVGASSTRÖM" [METHOD AND SYSTEM FOR ADAPTING A SUPPLY OF ADDITIVE TO AN EXHAUST GAS STREAM], and which has the same applicant and submission date as the present application and also filed as PCT Application WO2015115979, is exemplified below. However, for the example shown in FIG. 4 and for the present invention, the adaptation can be arranged so as to be performed in any suitable manner, and the invention is thus entirely independent of the manner in which a correction factor is determined.

FIG. 5 illustrates the present invention. Blocks 501-503 essentially correspond to blocks 401-403 in FIG. 4. However, in contrast to FIG. 4, the dosage determined in block 503 is also the actual dosage, i.e. the control signal that is conducted out to, for example, an actuator for controlling the injection nozzle to inject the additive.

According to the present invention, the estimation of the nitrogen oxide content upstream of the supply of additive is corrected instead of applying the determined correction factor to the dosage of additive requested, as in FIG. 4, i.e. the nitrogen oxide content as calculated by means of the calculation model is corrected by utilizing the correction factor determined in connection with the adaptation rather than correcting the determined dosage of additive.

This means that the desired emissions $tpNO_x$ are compared in block 501 to the calculated unreduced presence of nitrogen oxides, $rawO_x$, whereupon the presence of $rawNO_x$ as calculated by means of the calculation model is corrected by the adaptation factor determined in connection with the adaptation. A desired conversion rate can thus be determined in block 501, where said conversion rate is determined so that the desired $tpNO_x$ will be obtained based on the current presence of $rawNO_x$. The conversion rate is then translated, block 502, into a corresponding ammonia-nitrogen oxide ratio (ANR) as per the foregoing, which, according to the foregoing, can be determined, for example, through the utilization of a suitable representation of a curve of the type shown in FIG. 3. A dosage of additive is then determined in block 503 based on the determined ammonia-nitrogen oxide ratio (ANR), wherein the determine dosage depends on the amount of $rawNO_x$.

According to the present invention, the supply of additive is thus corrected by correcting one parameter ($rawO_x$) before the conversion rate etc is even calculated, i.e. before the dosage is determined, whereupon the dosage then calculated does not, in and of itself, need to be further corrected. This has the advantage that, for example, proportional errors that may affect the precision of the calculation model when calculating $rawNO_x$ are compensated for in the calculations. For example, uncertainties due to, for example, changes in environmental factors, such as the prevailing ambient humidity conditions, are compensated for by proceeding according to the invention. Correcting the supply of additive by correcting the estimate of $rawNO_x$ rather than correcting the determined dosage as per the prior art yields a correction that does not involve a risk, in the same way, of producing exaggerated effects when the conversion rate is changed from the conversion rate at which the adaptation was performed.

Regarding the adaptation, it can be performed in any arbitrary suitable manner, such as in accordance with any of the adaptation methods present in the prior art. As noted above, the adaptation can advantageously also be arranged so as to be performed in accordance with the adaptation method described in the co-pending application "FÖRFARANDE AND SYSTEM FÖR ATT ADAPTERA TILLFÖRSEL AV TILLSATSMEDEL TILL EN AVGASSTRÖM" [METHOD AND SYSTEM FOR ADAPTING A SUPPLY OF ADDITIVE TO AN EXHAUST GAS STREAM]. A high conversion rate is applied many times and, as noted above, the conversion rate is often lowered during adaptation in order to avoid obtaining an erroneous adaptation result due to the cross-sensitivity of the NOx sensor to ammonia. However, such an adaptation has the disadvantage that the lowering of the conversion rate unavoidably entails increased emissions of nitrogen oxides $NO_x$. This results in turn in it not being possible to perform the adaptation with just any frequency, because of the increased emissions, and the options in terms of adaptation (such as the time permitted to perform the adaptation) may also be subject to government regulations.

Figure 6:
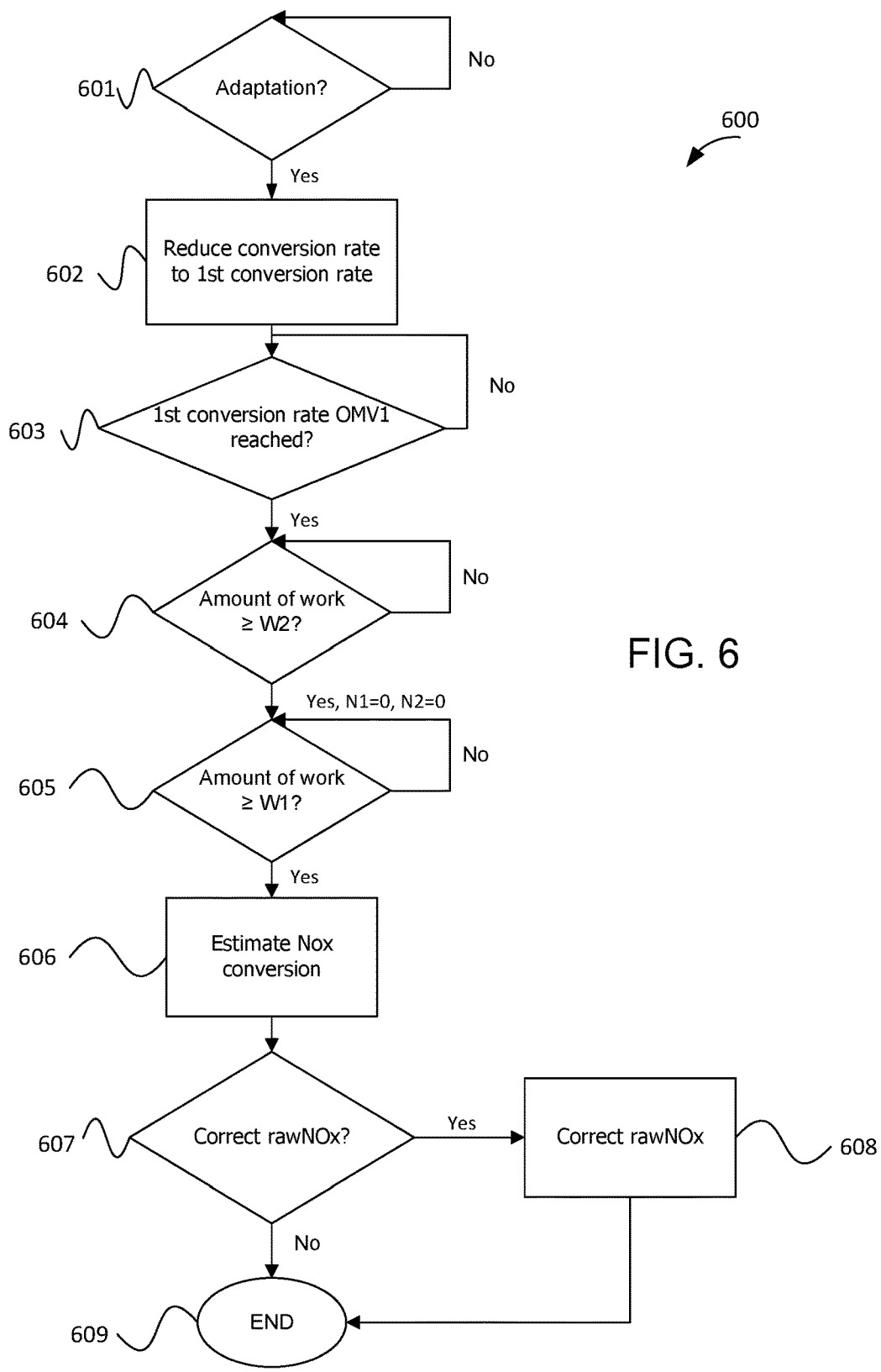
FIG. 6 schematically depicts an exemplary method according to one embodiment of the present invention.

The co-pending application "FÖRFARANDE AND SYSTEM FÖR ATT ADAPTERA TILLFÖRSEL AV TILLSATSMEDEL TILL EN AVGASSTRÖM" [METHOD AND SYSTEM FOR ADAPTING A SUPPLY OF ADDITIVE TO AN EXHAUST GAS STREAM] provides an adaptation method that better utilizes the available adaptation time. Reference is made in general to said application for a general description of the adaptation method illustrated therein, but the adaptation method described in said application is also shown in FIG. 6, adapted to the present invention. The method begins in step 601, where it is determined whether an adaptation is to be performed. If such is the case, the method transitions to step 602. The adaptation can, for example, be arranged so as to be performed at suitable intervals, or when the $NO_x$ sensor 208 emits values indicating that adaptation should be performed, or for another suitable reason.

In step 602 the conversion rate is reduced (set) to a first conversion rate OMV1, which can consist of any suitable conversion rate, such as 80% according to the example shown in FIG. 3, or some other suitable conversion rate. As can be seen, the setting to said first conversion rate is performed via a reduction of the supply of additive to a supply that corresponds to the desired conversion rate. The method then continues to step 603, where it is determined whether a switch to said first conversion rate OMV1 has been carried out. A degree of inertia generally prevails in the system, e.g. due to ammonia $NH_3$ stored in the SCR catalytic converter 201. It may consequently take a certain amount of time before the stored/built-up ammonia $NH_3$ has been consumed and the conversion rate has thus actually been reduced. Said reduction can be assumed to a take a certain amount of time, but, according to the present embodiment, a determination is instead made as to whether an amount of work W2 has been performed by the combustion engine 101 since the reduction of the conversion rate to said first reduction rate was requested. For example, said amount of work can consist of an amount of work that is expected to reduce the built-up ammonia $NH_3$ to the desired extent.

Figure 7:
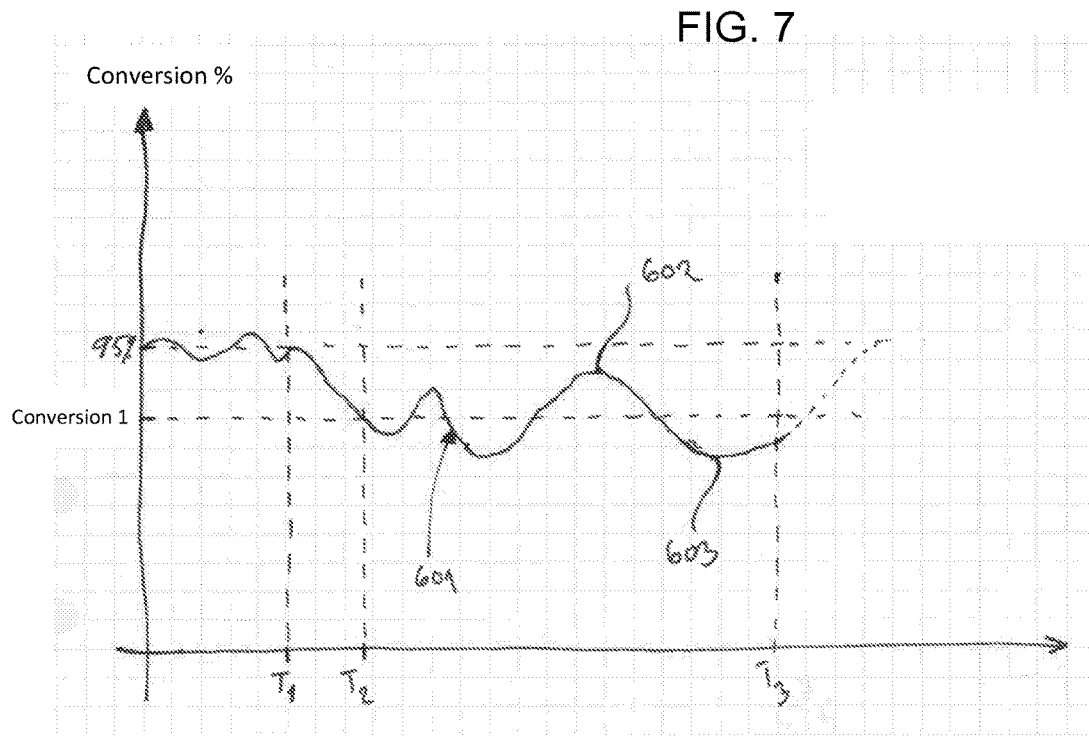
FIG. 7 shows an example of the change in the conversion rate over time for an adaptation according to the present invention.

This is illustrated in FIG. 7, where the adaptation process according to FIG. 6 is depicted. Up until time $T_1$ the vehicle 100 is driven at some suitable anticipated conversion rate, such as 95%. In connection with adaptation, a lowering of the setpoint value for the nitrogen oxide conversion to OMV1 (e.g. to 80%) is then initiated at time $T_1$. Starting as of time $T_1$, a "settling time" is thus applied so that, e.g. ammonia built-up in the SCR catalytic converter 201 will be reduced to the desired extent, and wherein said settling time thus consists, according to one embodiment, of an amount of work performed by the combustion engine 101. The actual time that the settling process takes, i.e. the time from time $T_2$ in FIG. 7, can thus vary from one time to another depending upon the prevailing load on the combustion engine 101, and thus the amount of nitrogen oxides generated per unit of time.

In step 603 a determination is thus made as to whether a desired amount of work W2 has been performed by the combustion engine 101, and as long as this is not the case, the method remains in step 603, while the method will continue to step 604 once the desired amount of work W2 has been performed at time $T_2$ in FIG. 7. Said amount of work W2 can be estimated in any arbitrary suitable way, and the control system of the vehicle 100 usually contains efficient functions for estimating the work that is performed by the combustion engine 101. The work can, for example, be represented as an amount of work expressed in kilowatt hours (kWh) or another suitable unit, or alternatively represented as, for example, an amount of fuel supplied to the combustion engine 101, such as, for example, a given volume and/or weight, or a calculated energy content for the supplied fuel. According to one embodiment, a settling time is instead used that consists of some suitable amount of time that thus need not be controlled by the work performed by the combustion engine.

In step 604 the actual adaptation is initiated, and it is performed during time $T_2$-$T_3$ in FIG. 7 by setting a first variable $N_1$ and a second variable $N_2$ to zero, wherein said variables $N_1$ and $N_2$ respectively represent cumulative nitrogen oxide amounts after and before the SCR catalytic converter 201, i.e. $tpNO_{x,ack}$ and $rawNO_{x,ack}$. A variable representing the generated combustion engine work can similarly be set to zero. The $NO_x$ sensors 207, 208 indicate an $NO_x$ content present in the exhaust gas stream, and the actual amount of nitrogen oxide $NO_x$ can be determined by using said $NO_x$ content together with the exhaust gas stream flow, which can be determined in an appropriate manner, such as by means of a flow meter. Said amounts of nitrogen oxide $N_1$ and $N_2$ accumulate continuously as long as an amount of work W1 is being determined in step 605, which work can, for example, consist of an ever-greater amount of work compared to the amount of work W2 not yet performed by the combustion engine 101 of the vehicle 100 since the accumulation of nitrogen oxides $NO_x$ was initiated. The amounts of nitrogen oxides $NO_x$ before and after the SCR catalytic converter 201 will be accumulated as long as the desired amount of work W1 since the accumulation was initiated has not been completed.

Once the desired amount of work W1 during ongoing accumulation has been completed, the accumulation of nitrogen oxide is discontinued, and the method continues on to step 606, where the $NO_x$ conversion is estimated, which can be performed, for example, using Equation 1 above, or through the use of a corresponding equation. For example, the conversion rate can be written as (not expressed in percent in this example):

$$\left(1 - \frac{tpNO_{x,ack}}{rawNO_{x,ack}}\right) = \left(1 - \frac{N1}{N2}\right) \qquad \text{(Equation 2)}$$

In step 607 a determination is then made as to whether a correction of the supply of additive is to be carried out and, if this is not the case, e.g. because the estimated conversion rate corresponds to the desired conversion rate, the method is concluded in step 609, while the supply of additive will otherwise be corrected in step 608 before the method ends in step 609. This correction can, for example, be determined as a correction factor, which can be written, for example, as $$\frac{OMV_{bör}}{OMV_{est}}.$$

The correction factor can also be calculated in another suitable way, based on an estimated conversion rate. Once the accumulation of nitrogen oxide $NO_x$ has been concluded at time T3 in FIG. 7, the setpoint value for the reduction of nitrogen oxides $NO_x$ can be reset, e.g. in any suitable one of steps 606-609, to the prevailing setpoint value prior to the adaptation, or to another suitable setpoint value.

The method shown in FIG. 6 has the advantage that the adaptation can occur continuously and, by performing the estimation for a given amount of work, the adaptation can occur continuously regardless of whether the combustion engine 101 is delivering high or low power at the time. The time that the adaptation takes, i.e. the time between times T2-T3 in FIG. 7, will thus vary from one instance to another, whereupon the adaptation under a low combustion engine load will take a longer time, as it will take a longer time before the desired amount of nitrogen oxides has been accumulated.

The present invention has been described above in connection with the reduction of nitrogen oxide $NO_x$, but, as one skilled in the art will realize, the invention is equally applicable to the reduction of any arbitrary substance wherein conversion occurs through the use of a supplied additive. The supply of additive generally follows some suitable curve, wherein said curve can be measured in engine test cells using extremely accurate sensors, and wherein the amount of supplied additive is controlled based, for example, on the amount of nitrogen oxides $NO_x$ indicated through the utilization of the calculations as per the foregoing. The present invention thus provides a compensation factor for compensating for the calculated nitrogen oxide content upstream of the supply of additive with a view to reducing or eliminating deviations for such a curve.

The present invention has been exemplified above in connection with vehicles. However, the invention is also applicable to any arbitrary means of transport, such as aircraft or watercraft, and to industrial installations in which a control system is used to control the functions that are present, and wherein parameters pertaining to the physical conditions for a unit that is being controlled by the control system can be determined.

Additional embodiments of the method and the system according to the invention are found in the accompanying claims. It is to be noted that the system can be modified according to various embodiments of the method according to the invention (and vice versa), and that the present invention is thus in no way limited to the aforedescribed embodiments of the method according to the invention, but rather relates to and comprises any and all embodiments within the scope of the accompanying independent claims.

For example, as noted above, the present invention is also applicable when a sensor is used to determine the presence of $NO_x$ in the exhaust gas stream resulting from the combustion upstream of the supply of additive. According to this embodiment, the amount of $NO_x$ (or another suitable substance) is compensated for before the conversion rate etc. is determined, i.e. the calculation model in FIG. 5 is replaced by a sensor, whereupon the depicted method is otherwise performed as set out above.

Furthermore, the present invention is, for example, applicable to the adaptation of all currently known and future additives supplied to the exhaust gas stream to reduce any substance present in the exhaust gas stream. The invention according to the above is equally applicable regardless of what substance in the exhaust gas stream is being reduced. The invention is thus in no way limited to the reduction of nitrogen oxides, or to additives from which ammonia is formed.

The invention claimed is:

1. A method in connection with the supplying of a first additive for treating an exhaust gas stream resulting from combustion in a combustion engine, wherein said first additive is supplied to said exhaust gas stream, and wherein said first additive is utilized to reduce at least a first substance, wherein said method comprises:
   supplying a first additive to the exhaust gas stream;
   estimating a reduction of said first substance based on a first measurement of a presence of said first substance in said exhaust gas stream downstream of said supply of said first additive, and a second measurement of a presence of said first substance in said exhaust gas stream upstream of said supply of additive;
   comparing said estimated reduction with a first reduction; and
   correcting said second measurement of said first substance based on said comparison.

2. A method according to claim 1, further comprising:
   determining said first measurement by utilization of signals emitted by a first sensor arranged downstream of said supply of said first additive.

3. A method according claim 2, wherein said second measurement consists of an estimated measurement, wherein said correction of said second measurement constitutes a correction of an estimation of said second measurement.

4. A method according to claim 1, wherein said second measurement is estimated through the utilization of a calculation model.

5. A method according to claim 4, wherein said calculation model consists at least in part of a model of the combustion in said combustion engine.

6. A method according to claim 1, further comprising, based on said comparison of said estimated reduction with said first reduction:
   determining a correction factor for correcting the estimation of said second measurement.

7. A method according to claim 1, further comprising:
   correcting the estimation of said second measurement when said estimated reduction is below said first reduction so that the estimated presence of said first substance after correction exceeds the estimated presence without correction; and/or
   correcting the estimation of said second measurement when said estimated reduction exceeds said first reduction so that the estimated presence of said first substance after correction is below the estimated presence without correction.

8. A method according to claim 1, further comprising:
   performing a first accumulation of a representation of said first substance downstream of said supply of additive during a first time;
   performing a second accumulation of a representation of said first substance upstream of said supply of additive during said first time; and
   estimating said reduction of said first substance based on said first and second accumulation.

9. A method according to claim 8, further comprising:
   estimating said reduction of said first substance by determining a ratio between said first accumulation and said second accumulation;
   comparing said determined ratio to a first ratio; and
   correcting the estimation of said second measurement based on said comparison.

10. A method according to claim 8, further comprising, when said first accumulation and said second accumulation have been initiated:
    determining whether a first amount of work has been performed by said combustion engine during the accumulation of said first substance; and
    discontinuing the accumulation of said first substance once said first amount of work has been performed by said combustion engine.

11. A method according to claim 1, wherein said first additive is supplied upstream of a first catalytic converter, and wherein said presence of said first substance in said exhaust gas stream downstream of said supply of said first additive consists of a presence of said first substance downstream of said first catalytic converter.

12. A method according to claim 10, wherein said first catalytic converter consists of an SCR catalytic converter.

13. A method according to claim 1, further comprising, before said estimation of said reduction of said first substance:
reducing the supply of additive to a first amount, wherein said first amount consists of an amount corresponding to a reduction at which a smaller amount of additive is supplied than is needed for a complete reduction of said first substance, wherein said first reduction corresponds to the anticipated reduction in connection with the supply of said first amount.

14. A method according to claim 12, wherein said first amount consists of an amount at which the anticipated conversion rate for the reduction of said first substance maximally equals any of the conversion rates comprising: 90% of complete reduction, 80% of complete reduction, 50% of complete reduction.

15. A method according to claim 12, further comprising, before said estimation of said reduction:
reducing the supply of said first additive to said first amount; and
initiating said estimation of said reduction a first time after said supply of said first additive has been reduced.

16. A method according to claim 12, further comprising:
determining whether a second amount of work has been performed by said combustion engine after the reduction of said supply of said first additive was initiated; and
initiating said estimation of said reduction when said second amount of work has been performed by said combustion engine.

17. A method according to claim 12, further comprising:
discontinuing reduction of said supply of said first additive when said second measurement has been corrected.

18. A method according to claim 1, wherein said first reduction consists of an anticipated, or set, reduction.

19. A method according to claim 1, wherein said supply of additive is controlled so that the anticipated reduction consists of said first reduction.

20. A method according to claim 1, further comprising control of the supply of first additive based on said corrected second measurement.

21. A vehicle comprising a system for use in connection with the supplying of a first additive for treating an exhaust gas stream resulting from combustion in a combustion engine, wherein said first additive is supplied to said exhaust gas stream, and wherein said first additive is used to reduce at least a first substance present in said exhaust gas stream, wherein the system comprises elements configured to:
estimate a reduction of said first substance based on a first measurement of a presence of said first substance in said exhaust gas stream downstream of said supply of said first additive, and a second measurement of a presence of said first substance in said exhaust gas stream upstream of said supply of additive;
compare said estimated reduction to a first reduction; and
correct said second measurement of said first substance based on said comparison.

22. A computer program for use in connection with the supplying of a first additive for treating an exhaust gas stream resulting from combustion in a combustion engine, wherein said first additive is supplied to said exhaust gas stream, and wherein said first additive is used to reduce at least a first substance present in said exhaust gas stream, wherein the computer program product is stored in a non-transitory computer-readable medium and comprises computer-readable program code portions embodied therein, the computer-readable program code portions configured to cause an electronic processor to:
supply a first additive to the exhaust gas stream;
estimate a reduction of said first substance based on a first measurement of a presence of said first substance in said exhaust gas stream downstream of said supply of said first additive, and a second measurement of a presence of said first substance in said exhaust gas stream upstream of said supply of additive;
compare said estimated reduction to a first reduction; and
correct said second measurement of said first substance based on said comparison.

23. A system for use in connection with the supplying of a first additive for treating an exhaust gas stream resulting from combustion in a combustion engine, wherein said first additive is supplied to said exhaust gas stream, and wherein said first additive is used to reduce at least a first substance present in said exhaust gas stream, wherein the system comprises elements configured to:
estimate a reduction of said first substance based on a first measurement of a presence of said first substance in said exhaust gas stream downstream of said supply of said first additive, and a second measurement of a presence of said first substance in said exhaust gas stream upstream of said supply of additive;
compare said estimated reduction to a first reduction; and
correct said second measurement of said first substance based on said comparison.

* * * * *